Aug. 28, 1962  E. A. GRAFTON  3,051,287
SPOOLS FOR BUSINESS MACHINES
Filed June 1, 1960
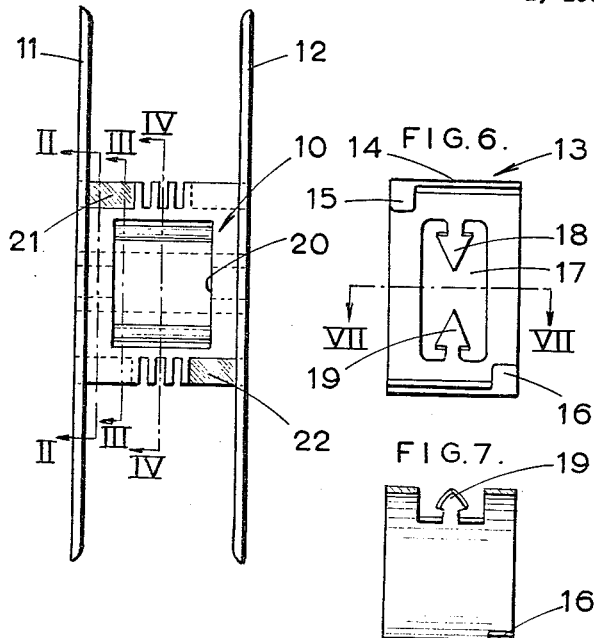
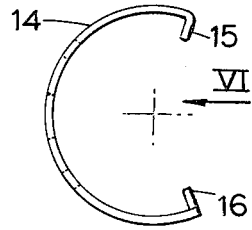
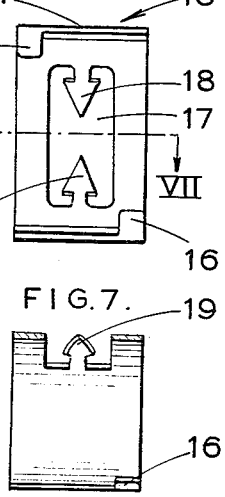
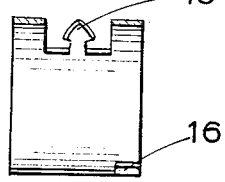
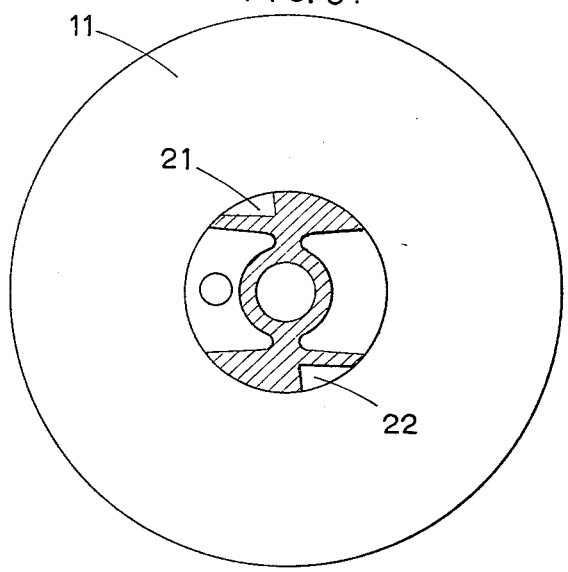
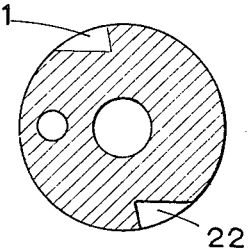
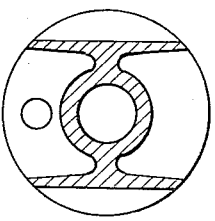
INVENTOR
ERIC ALEXANDER GRAFTON,
BY Silverman, Mullin & Cass
ATTORNEYS

United States Patent Office 3,051,287
Patented Aug. 28, 1962

3,051,287
SPOOLS FOR BUSINESS MACHINES
Eric Alexander Grafton, Eltham, London, England, assignor to Walter Grafton & Son Limited, London, England
Filed June 1, 1960, Ser. No. 33,187
Claims priority, application Great Britain June 5, 1959
6 Claims. (Cl. 197—175)

This invention relates to spools for business machines and, in particular, to means for retaining ribbons on spools.

With the increasing speeds of present ribbon-winding machines the amount of time taken in attaching the ribbon to the spool tends to take up a larger proportion of the time occupied by the complete operation. Usual attachment means comprise a barbed prong which is formed, e.g. in a metal spool, by a cut-out on the cylindrical surface of the hub. There is, however, a movement towards plastic moulded spools, in which the formation of such a prong presents difficulties. It has already been proposed to make prongs in metal for insert casting or moulding, but this has disadvantages, and the provision of a prong moulded in one with the spool has not only hitherto proved difficult but may be unsatisfactory if insufficient strength can be given to the prong.

It is therefore an object of the invention to provide means of simple construction whereby a ribbon may be attached to a spool, whether the spool be of metal or plastic or any other material.

According to the invention, a clip for the hub of a ribbon spool for a business machine comprises a cylindrical member arranged to extend around at least part of the periphery of the hub, having means to be secured detachably to the hub and means to which a ribbon can be secured.

The member is preferably of springy metal and arranged to embrace more than half the periphery of the hub. The means to secure the clip to the hub may comprise in-turned lugs, and conveniently there may be two such lugs arranged diagonally at opposite corners of the clip so as to make the clip "handed" and cause its affixing to the hub to be such that it cannot be put on the wrong way round.

The means to secure the ribbon may conveniently comprise an aperture or recess in the clip arranged to define two oppositely facing prongs.

The invention also includes a spool for a business machine, comprising a hub and a pair of flanges arranged at the ends thereof, wherein the hub is formed with a peripheral aperture or recess to be spanned by a clip as described. The spool may have in addition in the hub two recesses to accommodate the lugs of a clip.

Preferably the spool is formed of moulded plastic, and by reason of the invention is of a readily mouldable shape, either in one piece or in several pieces. It may, however, be formed of stamped metal or other materials if desired.

The invention will be described with reference to the accompanying drawings, in which:

FIGURE 1 is an elevation of a spool, viewed in a radial direction,

FIGURE 2 is a sectional elevation on the line II—II, FIGURE 1,

FIGURE 3 is a section on the line III—III, FIGURE 1,

FIGURE 4 is a sectional elevation on the line IV—IV, FIGURE 1,

FIGURE 5 is a side elevation of a spring clip for the hub of the spool,

FIGURE 6 is a front elevation of the clip, viewed in the direction of the arrow VI, FIGURE 5, and FIGURE 7 is a sectional elevation of the clip on the line VII—VII, FIGURE 6.

Referring to the drawings, a typewriter spool has a hub 10 and two flanges 11, 12, and provided that it has the structural features to be described hereinafter it does not matter whether it is made of metal or plastic or any other material.

The clip 13 is of spring steel comprising a flat metal band 14 formed into the shape of a C and having an angle of embrace of about 220°. At each free end there is an in-turned lug 15, 16, of about one-fifth the width of the clip, located at one corner of the clip, and the two lugs are located at diagonally opposite corners. Midway between the ends of the clip there is formed a rectangular aperture 17 having defined therein two peripherally extending members, in the form of barbed prongs 18, 19, confronting one another.

Although the flanges 11, 12 of the spool may be of any desired construction, the hub 10 is required to have three recesses. The first and major one of these is a recess 20 of substantial size corresponding to the size of the H-shaped window 17 defining the prongs 18, 19, and the recess 20 in the hub is such that when the clip 13 is in position the window 17 is in register with the recess 20 and the prongs 18, 19 extend peripherally inwardly, there being a substantial space behind the prongs due to the presence of the recess 20. Two other recesses 21, 22 are formed in the hub 10, located both peripherally and axially in such positions as to accept the two in-turned lugs 15, 16 at the end of the clip 13.

In use, the clip 13 is sprung over the hub 10 so that the in-turned lugs 15, 16 engage in the recesses 21, 22. Owing to the lugs being "handed," it is impossible to put a clip on to a spool for which it is not intended. The central window 17 of the clip registers with the central recess 20 of the hub, so providing two prongs 18, 19 which are free-standing (although within the periphery of the combined clip and hub) and to either of which the end of a ribbon may be secured.

In this way there is provided a simple means for adding to a hub a clip whereby a ribbon may be rapidly and securely engaged for winding in either direction.

Instead of the clip 13 having in-turned lugs 15, 16 it may simply rely on its springiness to be retained in position when it has embraced the hub 10, but preferably to avoid any relative rotation between the clip and the hub there may be provided at any point an in-turned lug projecting radially inward from the clip to engage a corresponding recess in the hub.

I claim:

1. A ribbon spool for a business machine comprising, a cylindrical hub having a recess in the circumference thereof, and a cylindrical spring metal clip of substantially C-shaped cross-section frictionally engaged around the outside of said hub, said clip having at least one circumferentially extending prong member integral therewith and said clip having a formation giving free access to said prong to enable attaching a ribbon thereto, said recess and formation being substantially in registry one with the other, said hub and clip having cooperatively mated guide means for positioning said clip on the hub in said condition of registry, comprising, lug members on the opposite free ends of the clip and additional recesses in the circumference of the hub located to receive said lugs therein.

2. A ribbon spool as described in claim 1 in which said lugs are integral with and located at diagonally opposite corners of said free ends.

3. A ribbon spool for a business machine comprising, a cylindrical hub having a recess in the circumference thereof, and a cylindrical spring metal clip of substantially C-shaped cross-section frictionally engaged around the outside of said hub, said clip having a window intermediate the free ends thereof and at least one barbed prong integral with an edge of the window and extending into said window from a side edge thereof giving free access to said prong to enable attachment of a ribbon thereto, said recess and window being substantially in registry one with the other.

4. A ribbon spool for a business machine comprising, a cylindrical hub having a recess in the circumference thereof, and a cylindrical spring metal clip of substantially C-shaped cross-section frictionally engaged around the outside of said hub, said clip having a window intermediate the free ends thereof and at least one barbed prong integral with an edge of the window and extending into said window from a side edge thereof giving free access to said prong to enable attachment of a ribbon thereto, said recess and window being substantially in registry one with the other, said recess and window being of similar substantially rectangular configuration.

5. In a ribbon spool having a cylindrical, hollow hub provided with a circumferential recess and a pair of flanges at opposite ends of the hub, and means for attaching a ribbon on said hub comprising, a C-shaped spring metal clip, said clip having an aperture intermediate the ends thereof of substantially rectangular configuration and a pair of prongs integral with and extending into the aperture from opposite side edges of the aperture, said clip adapted to be frictionally engaged around the outside of said hub with said aperture in registry with said recess and the prongs accessible in said recess for attaching a ribbon thereto.

6. A structure as described in claim 5 in which there is an inwardly-turned lug integral with each free end of said clip.

References Cited in the file of this patent
UNITED STATES PATENTS

| | | |
|---|---|---|
| 930,327 | Wheeler | Aug. 3, 1909 |
| 1,175,995 | Ronchetti | Mar. 21, 1916 |
| 1,199,246 | Clark | Sept. 26, 1916 |
| 2,232,461 | Kuckhoff | Feb. 18, 1941 |
| 2,667,257 | Hurtado | Jan. 26, 1954 |
| 2,853,175 | Regentrop et al. | Sept. 23, 1958 |
| 2,873,839 | Bishop | Feb. 17, 1959 |
| 2,925,164 | Murphy | Feb. 16, 1960 |